US008672089B2

(12) United States Patent
Kelly et al.

(10) Patent No.: US 8,672,089 B2
(45) Date of Patent: Mar. 18, 2014

(54) BAFFLE ARRANGEMENT FOR A GENSET ENCLOSURE

(75) Inventors: Gary S. Kelly, Belfast (GB); Alan McKee, Belfast (GB)

(73) Assignee: Caterpillar (NI) Limited, Larne (GB)

( * ) Notice: Subject to any disclaimer, the term of this patent is extended or adjusted under 35 U.S.C. 154(b) by 144 days.

(21) Appl. No.: 13/131,434

(22) PCT Filed: Nov. 27, 2008

(86) PCT No.: PCT/EP2008/066302

§ 371 (c)(1),
(2), (4) Date: Aug. 5, 2011

(87) PCT Pub. No.: WO2010/060481

PCT Pub. Date: Jun. 3, 2010

(65) Prior Publication Data

US 2012/0097479 A1 Apr. 26, 2012

(51) Int. Cl.

| | |
|---|---|
| ***H02K 5/24*** | (2006.01) |
| ***F02B 77/13*** | (2006.01) |
| *H02K 5/00* | (2006.01) |
| *F02B 77/11* | (2006.01) |

(52) U.S. Cl.
USPC ............................ 181/202; 181/204; 290/1 B

(58) Field of Classification Search
USPC .................. 181/202, 204, 200; 123/3, 198 E; 290/1 A, 1 B
See application file for complete search history.

(56) References Cited

U.S. PATENT DOCUMENTS 2,089,928 A * 8/1937 Perkins ......................... 165/126
3,714,449 A 1/1973 De Bella
3,779,341 A * 12/1973 Huggins ....................... 181/225
3,897,850 A * 8/1975 Thompson et al. ........... 181/204
3,923,114 A * 12/1975 Suzuki ......................... 180/68.1
3,982,600 A * 9/1976 Gerresheim et al. ........ 180/69.21
4,116,269 A * 9/1978 Ikeda ........................... 165/126
4,122,353 A * 10/1978 Noguchi ....................... 290/1 A
4,169,501 A * 10/1979 Takeuchi et al. .............. 165/126
4,335,797 A * 6/1982 Simmons ................... 180/69.22
4,753,318 A * 6/1988 Mizuno et al. ................ 181/204
5,036,931 A * 8/1991 Iritani .......................... 180/68.1

(Continued)

FOREIGN PATENT DOCUMENTS

| | | |
|---|---|---|
| EP | 1120558 A1 | 8/2001 |
| GB | 1239568 | 7/1971 |
| JP | 59009132 | 1/1984 |
| JP | 9203326 | 8/1997 |

OTHER PUBLICATIONS

International Search Report from PCT/EP2008/066302, mailed on Sep. 2, 2009 (3 pages).

*Primary Examiner* — Edgardo San Martin

(74) *Attorney, Agent, or Firm* — Finnegan, Henderson, Farabow, Garrett & Dunner LLP

(57) ABSTRACT

A baffle arrangement for a genset enclosure is disclosed. The genset enclosure may include an opening in a side of the enclosure and a plurality of baffles internally supported in the enclosure between the opening and a radiator portion. The baffles may be positioned in a sound path to reflect a sound transmitted along the sound path. A method for reducing sound in a genset enclosure is also disclosed. The method may include arranging a plurality of baffles within the enclosure between an opening and a radiator portion, the baffles being positioned in a sound path to reflect a sound transmitted along the sound path.

19 Claims, 3 Drawing Sheets

(56) References Cited

U.S. PATENT DOCUMENTS

| | | | | |
|---|---|---|---|---|
| 5,121,715 | A * | 6/1992 | Nogami et al. | 123/41.7 |
| 5,168,130 | A * | 12/1992 | Shima et al. | 181/206 |
| 5,433,175 | A | 7/1995 | Hughes et al. | |
| 5,575,349 | A * | 11/1996 | Ikeda et al. | 180/68.1 |
| 5,625,172 | A * | 4/1997 | Blichmann et al. | 181/204 |
| 5,642,702 | A * | 7/1997 | Kouchi et al. | 123/198 E |
| 5,731,687 | A * | 3/1998 | Hirano et al. | 322/1 |
| 6,405,825 | B1 * | 6/2002 | Yabe et al. | 181/204 |
| 6,481,527 | B1 * | 11/2002 | French et al. | 181/201 |
| 6,491,133 | B2 * | 12/2002 | Yamada et al. | 181/200 |
| 6,688,424 | B1 * | 2/2004 | Nakada et al. | 181/224 |
| 6,784,574 | B2 * | 8/2004 | Turner et al. | 310/58 |
| 7,107,943 | B2 * | 9/2006 | Yasuda et al. | 123/41.62 |
| 7,841,314 | B2 * | 11/2010 | Nakashima et al. | 123/198 E |
| 7,872,865 | B2 * | 1/2011 | Matsushima et al. | 361/695 |
| 8,196,555 | B2 * | 6/2012 | Ikeda et al. | 123/41.49 |
| 2002/0104491 | A1 * | 8/2002 | Izumi | 123/41.49 |

* cited by examiner

BAFFLE ARRANGEMENT FOR A GENSET ENCLOSURE

PRIORITY

This is a U.S. National Stage Application under 35 U.S.C. §371 based on International Application No. PCT/EP2008/066302, filed Nov. 27, 2008, which is incorporated herein by reference in its entirety and for which priority is claimed.

TECHNICAL FIELD

This disclosure relates generally to enclosures for an engine-generator set. More particularly, the disclosure relates to the attenuation of sound emitted from the enclosure during operation of an engine-generator set.

BACKGROUND

An engine-generator or a genset may be a combination of an engine and a generator. Both components may be mounted together to form a single machine. A genset may provide electricity at various locations such as construction sites or emergency response sites. Generally, a genset may provide electricity for apartments, office buildings, hotels and hospitals.

A genset may be a small person-portable device or a larger device that may be mounted on a skid or a trailer, depending on the requirements and location, and the amount of power that is needed for a particular use. Often, a genset may be mounted within an enclosure, such as a removable shroud or cover.

Within the enclosure, adequate ventilation and cooling may be required to dissipate heat generated by the genset components for reliable operation of the genset. Generally, heat, from a genset, may be dissipated by natural convection. For instance, heat may be dissipated from an engine mounted radiator which may be cooled by air flowing through a compartment in the enclosure. An air flow may be usually produced by a radiator fan.

Besides heat, noise or sound may be also generated by the engine, by the generator and by the exhaust, and it is obviously desirable to keep such sound emissions as low as possible. Local authorities may also set sound regulations, which may include limits on maximum sound emissions. Hence, the sound emission from the genset enclosure may need to be within the maximum sound limits in order to operate legally. The enclosure may block or attenuate sound emanating from the engine or other genset components.

In order to provide adequate cooling within the genset enclosure, it may be necessary to provide openings within the enclosure for ventilation. Hence, sound may be emitted through the openings. In some genset enclosures, the radiator may be located near an opening to facilitate airflow through the enclosure.

To reduce sound emission through the openings, the number or size of openings in the compartment may be decreased. However, the air flow may decrease to a level where the cooling effect may be also reduced, resulting in an increase in temperature within the enclosure. This may adversely affect temperature sensitive components, such as an alternator, a fuel injection system, and various electronic components, such as microprocessors. A solution may be to increase the air flow by providing a fan which has a high rotational speed. However, the increase in fan speed may result in more noise being produced from the engine compartment.

Sound may also be reduced by lowering the fan speed or lowering engine output. However, such actions may decrease the overall efficiency of the machine. Sound dampers may be used to reduce or avoid the transmission of sound. The genset enclosure may be lined with sound dampers, which may either absorb or reflect the noise.

It is desirable to provide adequate ventilation through a genset enclosure with a minimal emission of sound from the genset enclosure. The present disclosure is directed, at least in part, to improving or overcoming one or more aspects of the prior art system.

BRIEF SUMMARY OF THE INVENTION

In a first aspect, the present disclosure describes a baffle arrangement for a genset enclosure comprising: an opening in a side of the enclosure; and a plurality of baffles internally supported in the enclosure between the opening and a radiator portion, the baffles positioned in a sound path to reflect sound transmitted along the sound path.

In a second aspect, the present disclosure describes a method for reducing sound in a genset enclosure comprising: arranging a plurality of baffles within the enclosure between an opening and a radiator portion, the baffles being positioned in a sound path to reflect a sound transmitted along the sound path.

Other features and advantages of the present disclosure will be apparent from the following description of various embodiments, when read together with the accompanying drawings.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a baffle arrangement for a genset enclosure. The baffle arrangement may allow ventilation or air flow through the enclosure and minimize sound emission from genset components.

Figure 1:
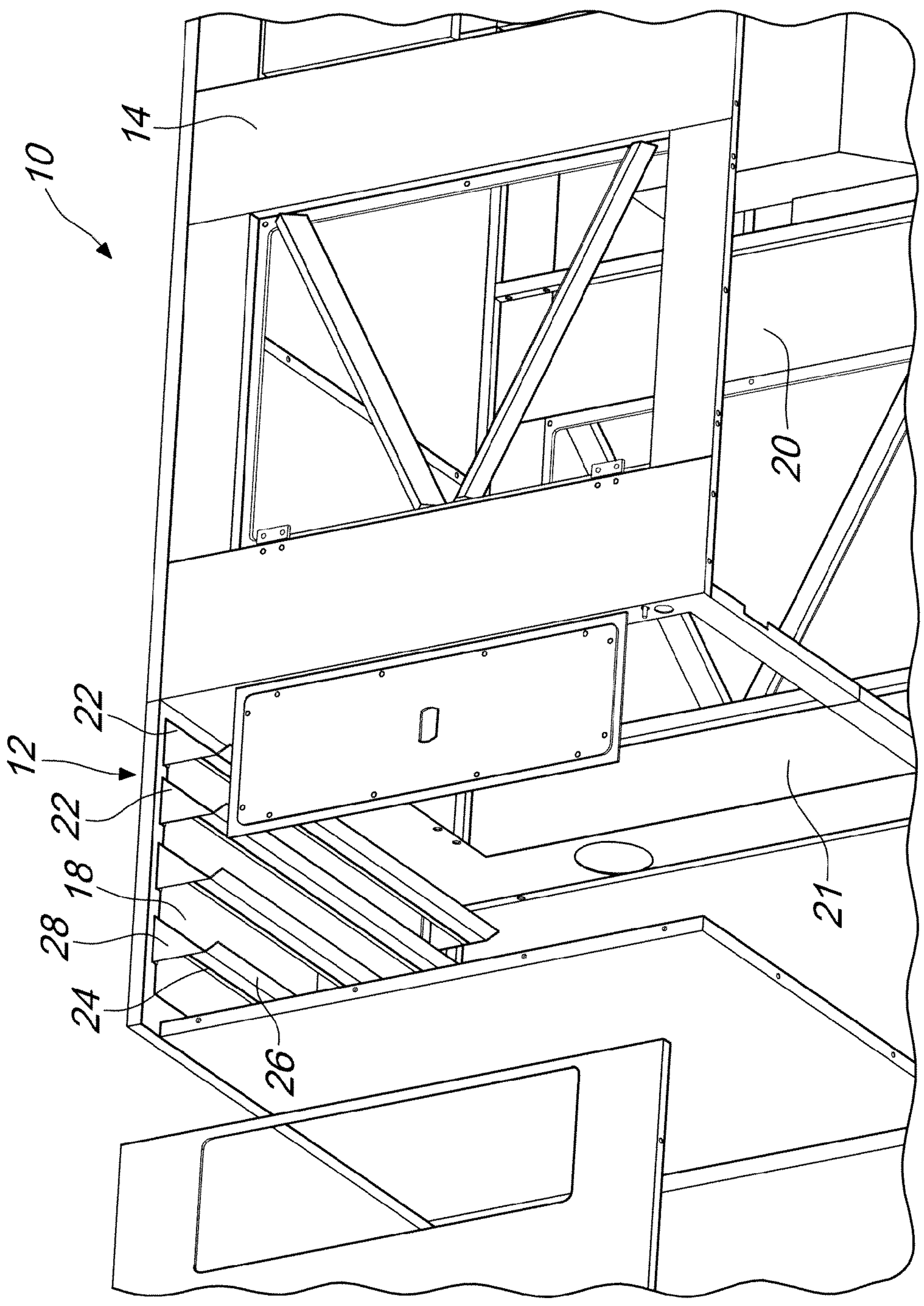
FIG. 1 is an isometric view of a partially assembled genset enclosure including a baffle arrangement according to the present disclosure.

With reference to FIG. 1, a genset enclosure 10 may comprise an embodiment of a baffle arrangement 12. The enclosure 10 may be bound by walls 14. The walls 14 may be of any suitable material and shape as required to contain the genset.

Walls 14 may have at least two openings to permit an airflow through the enclosure 10. A first opening may be an inlet and a second opening may be an outlet 18. The inlet and outlet 18 may allow the interior of the enclosure 10 to communicate with air space external thereto. The openings may allow passage of air into and out of the enclosure 10. The openings may be formed on any wall 14 or may be in any suitable position on the walls 14 of enclosure 10. The openings may include a matrix or a grid of holes to prevent passage of objects larger than the size of the holes.

In one embodiment, the inlet and the outlet 18 may be formed on multiple adjacent walls 14, for instance an outlet 18 may be formed in a corner of the enclosure, which may be a junction of three walls 14. The outlet 18 formed on a wall 14 may define a single plane. An outlet 18 formed on multiple adjacent walls 14 may define multiple planes, each plane corresponding to a wall 14.

An air passage 20 may be formed within the interior of the enclosure 10 and may be enclosed by walls 14. Ambient air external the enclosure 10 may enter through the inlet flow through the interior of the enclosure 10 along the air passage 20 and may exit through outlet 18.

The enclosure 10 may be divided into portions or sections to receive the genset or components of a genset. The sections or portions may be within the air passage 20 such that air flowing through the air passage 20 flows over the genset positioned within the sections or portions. The genset may comprise a radiator for transfer of heat to the air flowing through the air passage 20. The genset may comprise a fan wherein rotation of the fan draws air in through the inlet and forces air out of through the outlet 18 thereby driving circulation of the air through the air passage 20.

In one embodiment, the section or portion 21 of the enclosure 10 which receives the radiator may be adjacent to the outlet 18 or the plane of the outlet 18. In another embodiment the radiator section or portion 21 which receives the radiator may be normal to the outlet 18 or the plane of the outlet 18. In the embodiment where the outlet 18 may be formed on multiple adjacent walls 14, the radiator section or portion 21 may be normal to at least one plane of the outlet 18.

Figure 2:
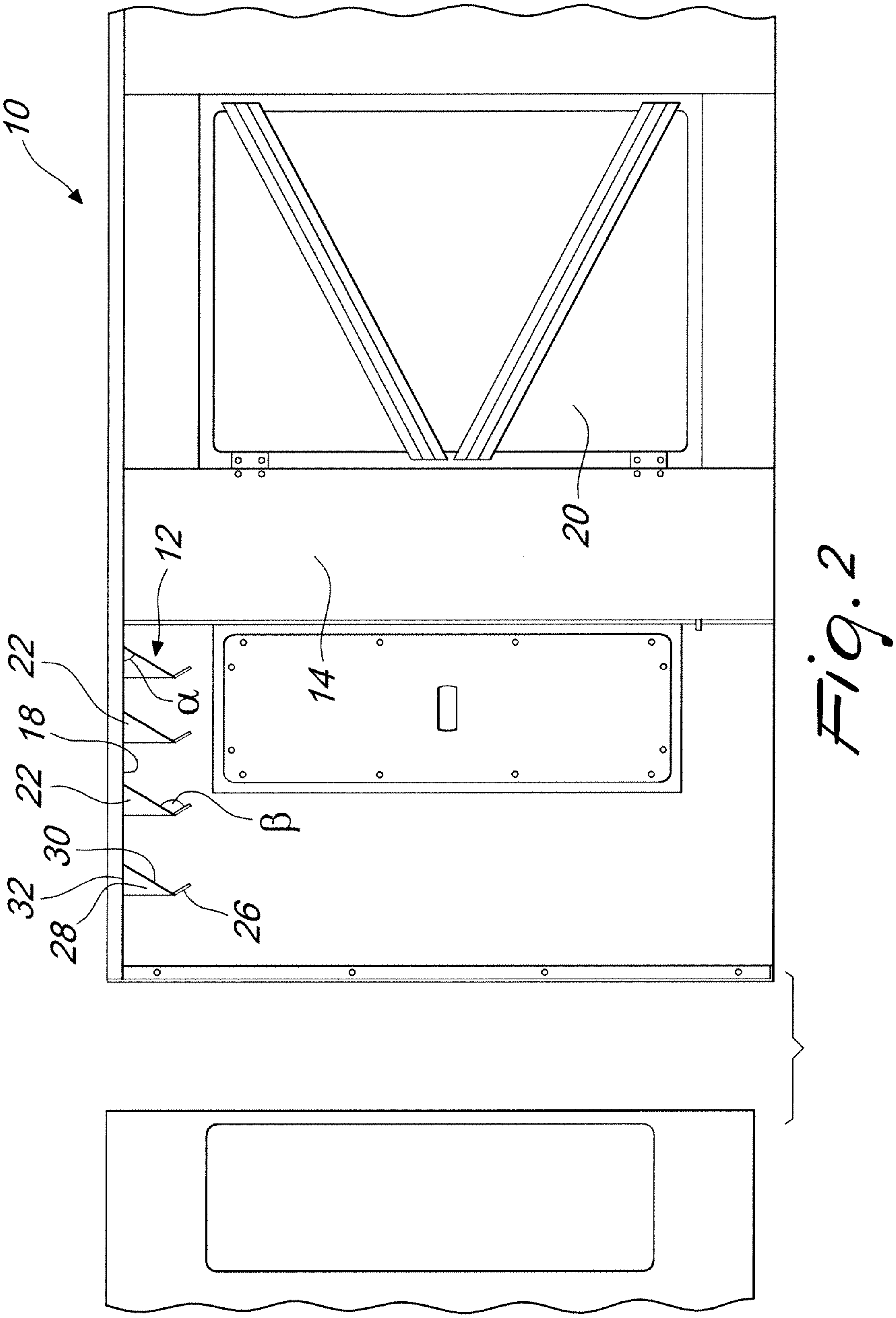
FIG. 2 is a side view of a partially assembled genset enclosure including a baffle arrangement according to the present disclosure.

With reference to FIGS. 1 and 2, one embodiment of a baffle 22 of the baffle arrangement 12 may comprise a body portion 24 and coupling portion 28. Baffle 22 may further comprise an incline portion 26.

Body portion 24 may be a panel, and an edge of the body portion 24 may be positioned transverse to the opening 18. Body portion 24 may be of a suitable length to extend across the outlet 18.

At both ends, body portion 24 may be connected to coupling portions 28. Body portion 24 may have a rigid connection to the coupling portions 28. Coupling portions 28 may have a triangular shape. In one embodiment, the coupling portions may comprise at least a connection edge 30 and a mounting edge 32.

Mounting edge 32 may be mounted to a support within the air passage 20. The support may be a wall 14, or a flange or bracket projecting from a wall 14. Mounting edge 32 may be mounted directly or indirectly through a flange or bracket to the wall 14 having the outlet 18 or to an adjacent wall 14. Mounting edge 32 may be fixedly or removably mounted to the support.

Body portion 24 of baffle 22 may be oblique to the plane of outlet 18 and may form an angle $\alpha$ relative to the plane of outlet 18. In one embodiment the angle $\alpha$ may range from 40° to 80°. In another embodiment the angle $\alpha$ may range from 50° to 70°. In a further embodiment the angle $\alpha$ may be 60°. In an assembled genset enclosure, the body portion 24 may incline away from the radiator portion 21.

Body portion 24 may be configured to be rotatable relative to coupling portions 28. Body portion 24 may have an angle $\alpha$ ranging from 0° to 90° relative to the plane of outlet 18. In another embodiment angle $\alpha$ may range from 50° to 70°.

Body portion 24 may be formed as a series of vanes which may be fixed or rotatable. Each vane may have an angle $\alpha$ ranging from 0° to 90° relative to the plane of outlet 18. In another embodiment angle $\alpha$ of the vanes may range from 50° to 70°. Connection edge 30 may connect to the body portion 24. Connection edge 30 may have an angle relative the plane of the opening which corresponds to an angle $\alpha$.

Incline portion 26 may be rigidly connected to an edge of body portion 24. In an assembled genset enclosure, the incline portion 26 may incline toward the radiator portion 21. Incline portion 26 may be oblique to the body portion 24 and may form an angle $\beta$ relative thereto. In one embodiment, the angle $\beta$ may range from 90° to 140°. In another embodiment, the angle $\beta$ may range from 100° to 130°. In a further embodiment, the angle $\beta$ may be 120°.

Incline portion 26 may be pivotably connected to an edge of body portion 24. The incline portion 26 may form an angle $\beta$ relative thereto. In one embodiment the angle $\beta$ may range from 80° to 140°. In another embodiment the angle $\beta$ may range from 100° to 130°. Baffle 22 may be mounted within air passage 20 such that air flowing through the air passage 20 may flow over the baffle 22 prior to exit through the outlet 18.

Baffle 22 may be composed of suitable materials for instance, galvanised steel, stainless steel or aluminium. Baffle 22 may be lined with a sound absorbent material, for instance foam. In one embodiment, baffle 22 may have 30 mm of foam. The sound absorbent material may be on the sides of body portion 24 and the incline portion 26 that face the radiator portion 21 of the enclosure 10.

The baffle arrangement 12 may comprise a plurality of baffles 22. The baffles 22 may be mounted to the support, through mounting edge 32, within the air passage 20. Each baffle 22 may be parallel to the adjacent baffle 22. The plurality of baffles 22 across the outlet 18 may form a series of inclined channels between the baffles 22. The channels direct the flow of air from the air passage 20 to the outlet 18.

In one embodiment, the baffle arrangement 12 may comprise from 2 to 10 baffles 22. In another embodiment, the baffle arrangement 12 may comprise from 4 to 8 baffles 22. The number of baffles 22 may be a function of the angle $\alpha$. In the embodiment where angle $\alpha$ or the angle of the vanes is 60°, the baffle arrangement 12 may have 4 baffles 22.

The baffle arrangement 12 may have an even spacing between baffles 22 along the outlet 18. In one embodiment, baffle arrangement 12 may have a varying spacing between baffles 22 along the outlet 18. The spacing between the baffles 12 may increase between each consecutive pair of baffles 22. In another embodiment, the spacing between each consecutive pair of baffles 22 may increase as the distance of the baffles 22 from the radiator portion 21 increases. In yet another embodiment, the spacing between each consecutive pair of baffles 22 may increase in proportion relatively to the increase in distance of the baffles 22 from the radiator portion 21.

In the baffle arrangement 12, a baffle 22 may extend over or overlap a portion of an adjacent baffle 22 in the direction of inclination of body portion 24. The degree of overlap between adjacent baffles 22 may be a function of the spacing between the baffles 22 and the angle of inclination of body portion 24. The series of overlapping baffles 22 in a baffle arrangement 12 may screen a part of the interior of the enclosure 10 from the outlet 18 of the enclosure 10. In one embodiment, the baffle arrangement 12 may form a screen between the outlet 18 and the radiator portion 21.

Baffles 22 may be connected together to pre-form the baffle arrangement 12. The pre-formed baffle arrangement 12 may be connected, by any suitable means, to the outlet 18. In one embodiment, the pre-formed baffle arrangement 12 may be removably coupled to a wall 14 or to a flange or bracket projecting from a wall 14, at the outlet 18. In another embodiment, the pre-formed baffle arrangement 12 may be fixedly mounted to a wall 14 or bracket projecting from a wall 14, at the outlet 18.

Figure 3:
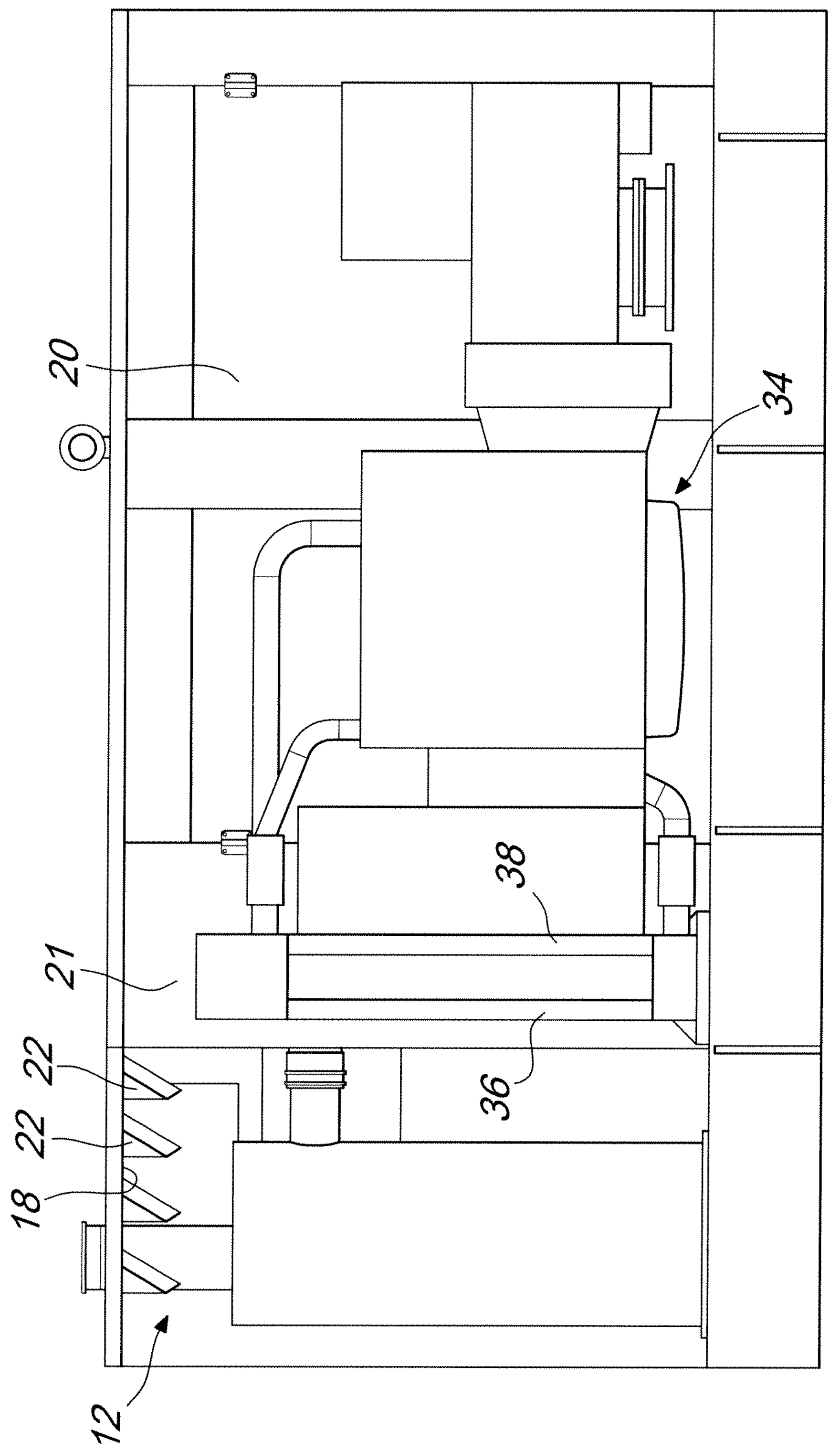
FIG. 3 is a schematic representation of genset components and a baffle arrangement in a genset enclosure, according to the present disclosure.

With reference to FIG. 3, a source of sound or noise in a genset 34 may be components of the genset, for instance the radiator 38, more particularly the radiator fan 36. Sound produced by the fan 36 may be transmitted from the radiator portion 21 along a sound path towards the outlet 18 and out to the area external the enclosure 10. The sound path may be a route of sound from the source, for instance the fan 36, to a destination, for instance the outlet 18. The route of sound may be a straight-line route between the source and the outlet 18.

A baffle 22 or a baffle arrangement 12 may be positioned in a sound path between the outlet 18 and the radiator portion 21. The placement of the baffle 22 or the baffle arrangement 12 in the sound path is such that sound travelling along the sound path may be reflected. The baffle 22 or baffle arrangement 12 may prevent a direct transmission of sound from the source to the outlet 18. In one embodiment, baffle 22 or baffle arrangement 12 may reflect the sound travelling in the sound path into the enclosure 10.

The position of the baffle 22 or the baffle arrangement 12 relative to outlet 18 may determine the rate of air flow and the level of sound emission. In one embodiment, the baffle 22 or baffle arrangement 12 may be positioned in proximity to the outlet 18. In a further embodiment, the baffle 22 or the baffle arrangement 12 may be positioned at the outlet 18.

In operation, fan 36 circulates air through the air passage 20. Air flowing through the air passage 20 may convey heat absorbed from the radiator 38 through the outlet 18 and out from the enclosure 10.

A baffle arrangement 12 may be positioned in the air passage 20 between the outlet 18 and the radiator portion 21 of the enclosure 10. Baffle arrangement 12 may permit the flow of heated air through the channels formed between the baffles 22. The baffle arrangement 12 may reflect sound produced by the genset components, for instance the radiator fan 36, and thereby restrict the level of sound emitted, through the outlet 18, from the genset during operation thereof.

The skilled person would realise that foregoing embodiments may be modified or combined to obtain the baffle 22 or the baffle arrangement 12 of the present disclosure Industrial Applicability This disclosure describes baffles 22 and baffle arrangements 12 for controlling sound transmission from a sound source to areas external to the genset enclosure 10. The baffle arrangement 12 according to the present disclosure may reflect sound from a source away from an outlet 18 of an enclosure 10. The baffle arrangement 12 may reflect sound travelling a transmission sound path from the sound source to the outlet 18 and may allow ventilation of the enclosure 10 and cooling of the radiator 38 by the air flow through air passage 20.

The incline portion 26 may be provided as an aerodynamic leading edge to the baffle 22 to minimize restriction to airflow. In an embodiment, incline portion 26 may be provided as an aerodynamic leading edge to the baffle 22 to minimize restriction to airflow when the sound absorbent foam is attached to body portion 24.

The baffle arrangement 12 according to the present disclosure may be suitable for genset enclosures. The industrial applicability of the baffle arrangement 12 as described herein will have been readily appreciated from the foregoing discussion.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A baffle arrangement for a genset enclosure comprising:
an opening in a side of the enclosure; and
a plurality of baffles internally supported in the enclosure between the opening and a radiator portion, the baffles positioned in a sound path to reflect a sound transmitted along the sound path,
wherein each of the plurality of baffles comprises a body portion and an incline portion connected to an edge of the body portion, the incline portion is oblique to the body portion, and
wherein the baffles are superposed on the opening.

2. The baffle arrangement of claim 1, wherein the plurality of baffles are parallel.

3. The baffle arrangement of claim 2, wherein at least a portion of each of the plurality of baffles is oblique relative to a plane of the opening.

4. The baffle arrangement of claim 3, wherein the at least a portion of each of the plurality of baffles comprises a series of vanes.

5. The baffle arrangement of claim 4, wherein the at least a portion of each of the plurality of baffles has an angle from 40° to 80° relative to the plane of the opening.

6. The baffle arrangement of claim 1, wherein a spacing between each of the plurality of baffles varies.

7. The baffle arrangement of claim 6, wherein the spacing between each of the plurality of baffles increases between each consecutive pair of baffles relative to the distance to the radiator portion.

8. The baffle arrangement of claim 7, wherein the radiator portion is normal to a plane of the opening.

9. The baffle arrangement of claim 1, wherein each of the plurality of baffles is removably supported.

10. A method for reducing sound in a genset enclosure comprising:
arranging a plurality of baffles within the enclosure between an opening and a radiator portion, the baffles being positioned in a sound path to reflect a sound transmitted along the sound path and superposed on the opening,
wherein each of the plurality of baffles comprises a body portion and an incline portion connected to an edge of the body portion, the incline portion is oblique to the body portion.

11. The method of claim 10, further comprising positioning the plurality of baffles in parallel.

12. The method of claim 11, further comprising positioning the plurality of baffles such that the spacing between each consecutive pair of baffles increases relative to the distance to the radiator portion.

13. The method of claim 12, further comprising inclining the plurality of baffles at an angle from 40° to 80° relative to a plane of the opening.

14. A genset enclosure, comprising a radiator;

an opening in a side of the enclosure, the opening configured to allow air to exit the enclosure through the opening; and a plurality of baffles supported in the enclosure between the opening and the radiator portion, each of the plurality of baffles including a body portion and an angled portion, the angled portion being angled toward the radiator, wherein the plurality of baffles are positioned in a sound path to reflect a sound transmitted along the sound path, wherein the angled portion is oblique to the body portion.

15. The genset of claim 14, wherein each of the plurality of baffles is lined with foam.

16. The genset of claim 14, wherein each of the plurality of baffles is superposed on the opening.

17. The genset of claim 14, wherein the radiator portion is normal to a plane of the opening.

18. The genset of claim 14, wherein each of the plurality of baffles is removably supported.

19. The genset of claim 14, wherein a spacing between each of the plurality of baffles varies.

* * * * *